US005812400A

United States Patent [19]
Eddy et al.

[11] Patent Number: 5,812,400
[45] Date of Patent: Sep. 22, 1998

[54] ELECTRONIC POSTAGE METER INSTALLATION AND LOCATION MOVEMENT SYSTEM

[75] Inventors: Eileen C. Eddy, Stamford; Dale A. French, Clinton; Iris E. Kishimoto, Norwalk, all of Conn.

[73] Assignee: Pitney Bowes Inc., Stamford, Conn.

[21] Appl. No.: 702,077

[22] Filed: Aug. 23, 1996

[51] Int. Cl.$^{6}$ ............................ G07B 17/04; G06F 19/00

[52] U.S. Cl. ........................ 364/464.2; 235/375; 235/382; 340/825.3; 340/825.31; 340/825.34; 395/651; 395/653

[58] Field of Search .................................... 235/375, 382, 235/382.5; 340/825.3, 825.31, 825.34; 364/464.11, 464.2, 400; 395/651, 652, 653

[56] References Cited

U.S. PATENT DOCUMENTS

| | | | |
|---|---|---|---|
| 3,978,457 | 8/1976 | Check, Jr. et al. | 340/172.5 |
| 4,122,526 | 10/1978 | Dlugos et al. | 364/705 |
| 4,168,533 | 9/1979 | Schwartz | 364/900 |
| 4,301,507 | 11/1981 | Soderberg et al. | 364/464 |
| 4,493,252 | 1/1985 | Clark | 101/71 |
| 4,535,419 | 8/1985 | Dlugos et al. | 364/900 |
| 4,579,054 | 4/1986 | Buan et al. | 101/91 |
| 4,725,718 | 2/1988 | Sansone et al. | 235/495 |
| 4,757,537 | 7/1988 | Edelmann et al. | 380/51 |
| 4,775,246 | 10/1988 | Edelmann et al. | 380/23 |
| 4,796,193 | 1/1989 | Pitchenik | 364/464.02 |
| 4,802,218 | 1/1989 | Wright et al. | 380/23 |
| 4,809,185 | 2/1989 | Talmadge | 364/464.13 |
| 4,813,912 | 3/1989 | Chickneas et al. | 364/464.02 |
| 4,831,555 | 5/1989 | Sansone et al. | 364/519 |
| 4,837,714 | 6/1989 | Brookner et al. | 364/464.2 X |
| 4,853,523 | 8/1989 | Talmadge | 235/492 |
| 4,858,138 | 8/1989 | Talmadge | 364/464.18 |
| 4,980,542 | 12/1990 | Jackson et al. | 235/375 |
| 5,051,564 | 9/1991 | Schmidt | 235/381 |
| 5,065,000 | 11/1991 | Pusic | 235/381 |
| 5,077,660 | 12/1991 | Haines et al. | 364/464.2 |
| 5,107,455 | 4/1992 | Haines et al. | 395/828 |
| 5,111,030 | 5/1992 | Brasington et al. | 235/375 |
| 5,173,657 | 12/1992 | Holdsclaw | 324/142 |
| 5,237,506 | 8/1993 | Horbal et al. | 364/464.02 |
| 5,293,319 | 3/1994 | DeSha et al. | 364/464.02 |
| 5,309,363 | 5/1994 | Graves et al. | 364/464.02 |
| 5,319,562 | 6/1994 | Whitehouse | 364/464 |
| 5,367,464 | 11/1994 | Abumehdi et al. | 364/464.02 |
| 5,369,401 | 11/1994 | Haines | 364/464.13 |
| 5,375,172 | 12/1994 | Chrosny | 380/51 |
| 5,390,251 | 2/1995 | Pastor et al. | 380/21 |
| 5,440,108 | 8/1995 | Tran et al. | 235/381 |
| 5,490,077 | 2/1996 | Freytag | 364/464.02 |
| 5,612,884 | 3/1997 | Haines | 364/464.13 |

FOREIGN PATENT DOCUMENTS

| | | |
|---|---|---|
| 0 493 949 | 7/1992 | European Pat. Off. . |
| 0 665 517 | 1/1995 | European Pat. Off. . |
| 44 22 263 | 6/1994 | Germany . |

OTHER PUBLICATIONS

Information Based Indicium Program dated Jun. 13, 1996.

Information Based Idicia Program Postal Security Device Specification dated Jun. 13, 1996.

*Primary Examiner*—Edward R. Cosimano
*Attorney, Agent, or Firm*—Steven J. Shapiro; Melvin J. Scolnick; David E. Pitchenik

[57] ABSTRACT

A method for initializing a value metering device includes delivering the value metering device to a user. The user establishes communications between the user and a remote data center. The user communicates to the data center identifying data associated with the user ordering the value metering device. The user communicates to the data center user account identifying data. The data center verifies the order identifying data and the account identifying data as being valid. The data center upon determining that the order identifying data and the account identifying data are valid, communicates enabling data indicative of the physical location of the value metering device for enabling the value metering device to operate.

17 Claims, 10 Drawing Sheets

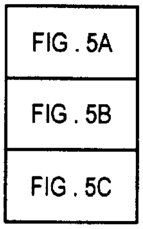
FIG . 5
FIG. 5A
2. CUSTOMER MOVES
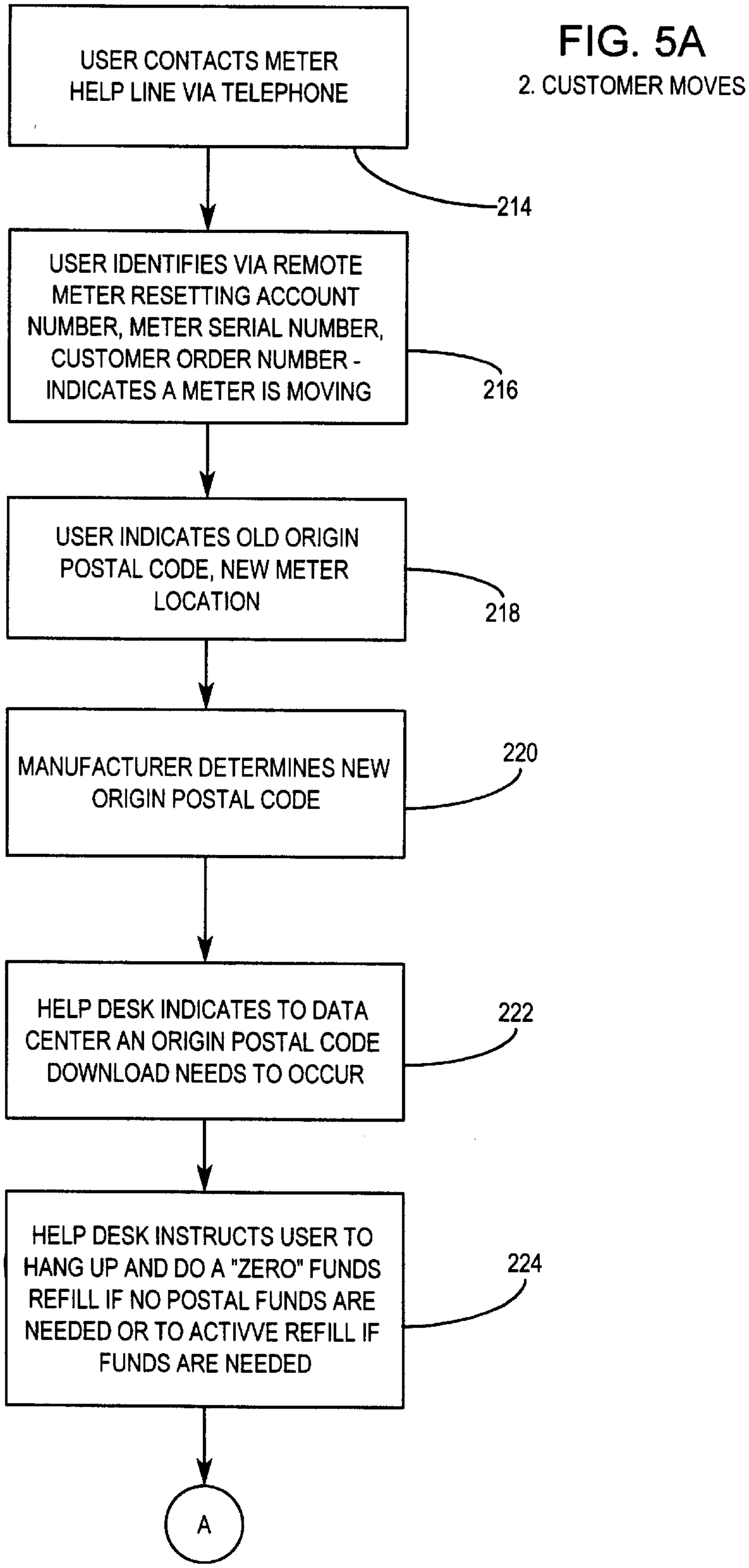

ELECTRONIC POSTAGE METER INSTALLATION AND LOCATION MOVEMENT SYSTEM

FIELD OF THE INVENTION

The present invention relates to electronic postage meters and, more particularly, to a system for remotely installing and supporting electronic postage meter location movement.

BACKGROUND OF THE INVENTION

Postage meters are devices which print unit value for postal or carrier delivery or other value related services. Since postage meters print the equivalent of money, in many countries they are registered (licensed) to a particular user and/or user location associated with the specific metering device as part of the requirements of various different postal and/or carrier services. These procedures, which may differ from country to country, provide a level of control and accountability for the use of postage metering systems.

Postage metering devices have been installed, activated and physical movement tracked through a manual process. This process has involved the meter manufacturer having a representative or other authorized individual physically take the metering device to a user location where it is to be installed or relocated.

At the customer location, the meter manufacturer representative or other authorized individual, may, for installation of the metering system, call a voice response unit or computer at a meter manufacturer facility. The voice response unit prompts the manufacturer representative to enter various pertinent data to the registration of the meter to the particular user through a touch tone key pad. Representative data that might be entered by the customer meter manufacturer representative includes the particular meter serial number, the customer order number, a remote meter resetting system account number. By entering this information, the specific meter associates a particular meter serial number with a particular customer for a given order number. Additionally, it may, if desired associate a charge account with the particular user. For non-remote meter resetting metering devices, the device would not have a remote meter resetting account number and the meter user would have to physically take the meter to the postal service office for resetting.

Traditionally, meters have been manufactured and packaged inside a container. Prior to Customer delivery, the meter is removed from the container at an authorized manufacturer district center or office where the meter receives a town circle containing a zip code. For digital meters, the same process occurs, however, the initialization process occurs between the meter and a personal computer operated at the district center. When the Customer receives the meter, only funds are required prior to printing values greater than zero.

The installation of metering systems has historically been a very expensive process. This is because a meter manufacturer representative must physically transport the metering system to the customer location for activation.

SUMMARY OF THE INVENTION

It is an object of the present invention to facilitate remote meter installation and activation at a customer site.

It is a further object of the present invention to automate and enable additional customer services to become immediately available to a metering system user.

It is yet a further object of the present invention to immediately facilitate the enabling of postage meter refilling, and/or removing funds, remote inspections immediately upon installation and activation of the metering system at the customer location.

It is the further object of the present invention to significantly reduce the cost of meter installation activation and physical movement of metering systems.

Still, another object is to provide traceability through an audit function capability through the various interaction of different systems in the installation and activation process.

A method of initializing a value metering device embodying the present invention includes delivering a value metering device to a user and establishing communications between the user and a remote data center. The user communicates to the data center identifying data associated with the user ordering the value metering device. The user communicates to the data center user account identifying data. The data center verifies the order identifying data and the account identifying data as being valid. The data center upon determining that the order identifying data and the account identifying data are valid, communicates enabling data for enabling the value metering device to operate.

In accordance with another aspect of the present invention, a method of initializing a value metering device having communications capability and display capability includes causing the value metering device to establish communications with a remote data center and the user entering into the value metering device order identifying data associated with the user ordering said value metering device and user account identifying data. The value metering device communicates to the data center the order data and the user account identifying data. The data center verifies the order identifying data and the account identifying data as being valid. The data center upon determining that the order identifying data and the account identifying data are valid communicates to the value metering device data relating to the physical location of said metering device.

In accordance with yet another aspect of the present invention, the value metering device displays said physical location data (or other data that may have been communicated from the data center) in the value metering display. The user operating the value metering device causes the value metering device to accept said physical location data (or other data) for storage in said value metering device if said physical location data (or other data) is correct.

In accordance with still another aspect of the present invention, the data communicated to the value metering device from the data center is stored at the data center. The value metering device is caused to establish subsequent communications with said data center and the value metering device communicating to said data center the physical location data (or other data) stored in the value metering device. The data center determines if said physical location data (or other data) has been correctly stored in said value metering device.

BRIEF DESCRIPTION OF THE DRAWINGS

Reference is now made to the following figures wherein like reference numerals designate similar elements in the various views and in which.

DETAILED DESCRIPTION OF THE PREFERRED EMBODIMENT

General Overview

Figure 1:
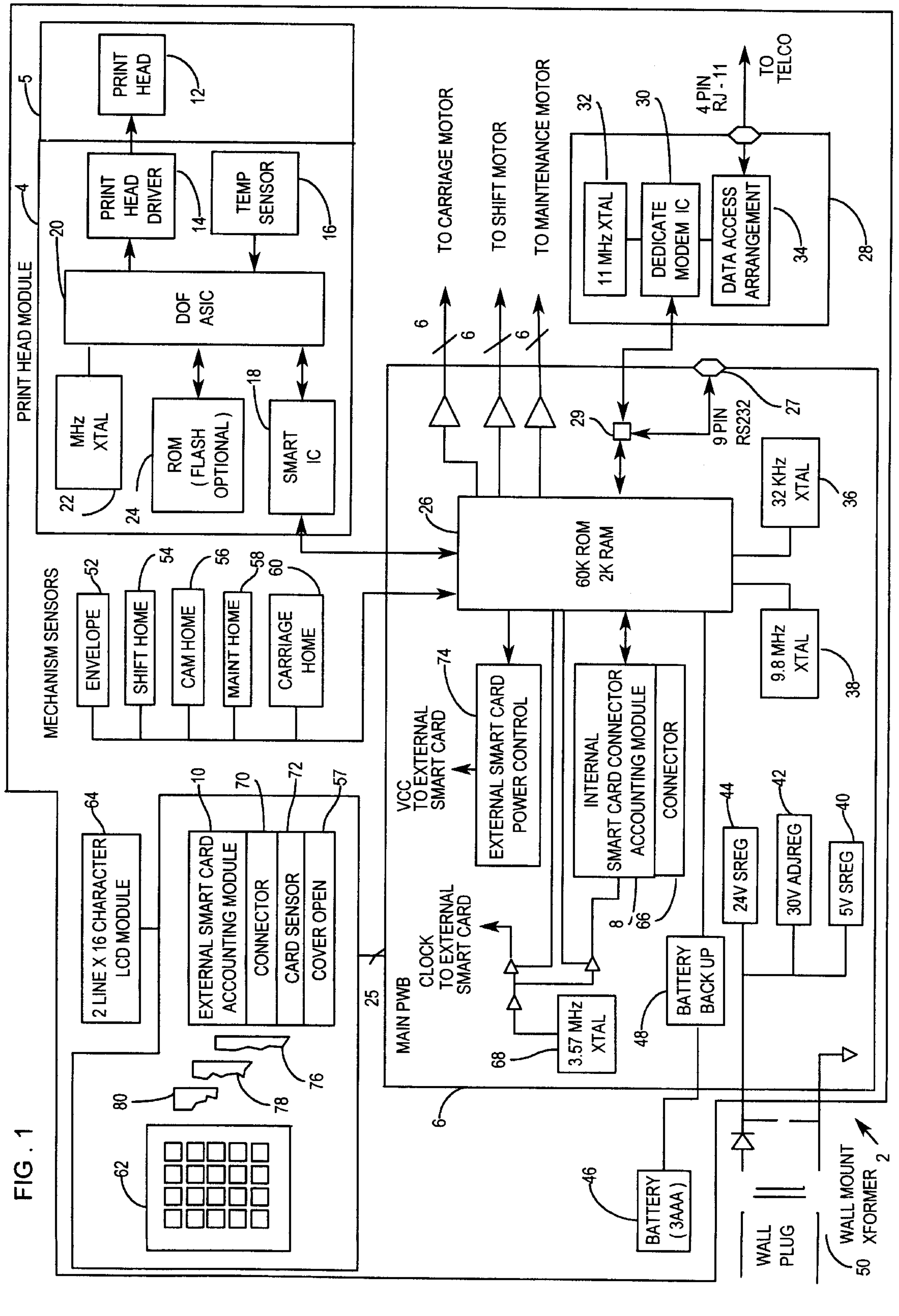
FIG. 1 is a schematic diagram of a postage meter system incorporating the present invention.

The electronic postage meter system shown in FIG. 1 includes an internal accounting system and a removable external accounting system. The external accounting system may be any suitable type of portable devices detachably coupled to the metering system. These include, for example, smart cards, ASICs, dongles and other types of removably coupled devices which provide for accounting functionality for a metering system. These may also include remote devices and systems which are detachably connectable to the metering system.

The metering system involves multi secure accounting systems such as smart cards to provide accounting capability and functionality enhancement for the metering system. The term vault is used herein interchangeably with the term accounting system. The metering system is enabled to either utilize an internal secure accounting system only, an external secure accounting system only, or multiple secure accounting systems. The multiple secure accounting system meter has a secure internal secure accounting system, but can also accommodate an external secure accounting system. This allows a family of metering products to be developed and implemented that provides increased functionality and capability.

Since portable devices are subject to loss and other security attacks such as theft or environmental problems such as bending, rubbing, exposure to dust, liquids, sharp objects, etc., the maximum amount of funds that are stored within such a portable device may be limited. The limit may be a maximum consistent with the value metering system, for example, one hundred ($100.00) dollars or any other selected amount. The internal secure accounting system may be a repository for larger amount of funds. Additionally, the portable device may be used in any of a large number of different metering systems, including Kiosk metering systems, thereby providing an increased functionality and utility to the meter system users.

The metering system shown in FIG. 1 includes an internal secure accounting system that may be physically mounted in the metering system at the time of manufacture. This internal secure accounting system may be a smart card permanently mounted in the metering system or the smart card chip without the larger housing of the card itself. Such an accounting system itself may be housed within its own secure housing such as is the case with a smart card chip or by means of a separate secure housing system. The smart card chip may consist of the smart card trimmed down to essentially a smaller version of the smart card. This may be manufactured by using a smart card plastic substrate that can be punched out from its carrier after the smart card chip is attached and thereafter the punched-out smart card chip mounted in the meter system. The punched-out smart card chip is like a normal smart card with most of the plastic substrate removed. The larger plastic substrate normally provides no functionality except to conform to the size requirements of the normal credit card and to position the chip on the plastic credit card. Since the smart card chip is devoted to being permanently mounted internally within the metering system, the smaller size is a benefit. That is, the punched-out smart card chip is never removed from the meter to be used in other non metering applications outside of the metering system except as explained herein. This smart card chip is an integrated circuit housed in a plastic holder which is then connected to the printed circuit board. It should be recognized that the integrated circuit itself can be directly mounted to the circuit board if desired or packaged in other integrated circuit formats.

The smart card chip may be permanently mounted within the appropriate printed circuit connector (plug removable) or designed to be mounted directly on a meter system printed circuit board. Additionally, the metering system accommodates an external secure portable accounting system (for example, smart card) as well as the internal securing accounting system (for example, smart card) thereby providing additional advantages. Thus, manufacturing of economics of scale are achieved because identical or similar smart card chips or other devices are used for the external and the internal accounting system.

The external secure accounting system when it is a smart card sized vault may be placed in a card slot or suitable detachable connector of the metering system. For a smart card, the card comes in contact with a special smart card connector designed for this purpose. That is, the metering system show in FIG. 1 has a sensing means such as a switch or other device to detect the presence of the smart card prior to applying voltage and reset to the pins on the card and also to sense the removal of the card or portable external accounting system.

The multi-accounting system approach provides various advantages including higher funds retention (storage) for the internal secure accounting system, higher reliability for the internal accounting system, portability of the external secure accounting system, and flexibility for multi functionality connection to the metering system such as ad slogans, "town circle graphics," authorization codes, date transfer, and rate table loading or software updates via the external secure accounting system connector.

Higher funds retention (storage) for the internal secure accounting system is enabled because postal funds and other value can be inserted into the internal accounting system because it is permanently installed and is less subject to being lost or stolen as is the case of a small external portable accounting system. Higher reliability for the internal secure accounting system occurs because it is mounted in the metering unit and is not subject to harsh external environments (temperature/humidity, ESD), adverse handling, multiple insertion that wear and/or contaminate the contacts as is a small external portable device. Portability of the external secure accounting system enables external devices to be used in multifunctional fashion such as a mini accounting system (that is a different card or external accounting system for each account) and enables the use of other features and functionalities. Additionally, added and other functionality may be included in the external accounting system such that, for example where the external secure accounting system is a smart card, the system can be a cash card or a credit card which additionally has postage accounting capabilities. Finally, as noted above, it is possible to employ the external vault as a vehicle to load ad slogans, rate tables, and authorization codes and other information into or out of the metering system. These transfers may be loaded under encryption control and/or be stored within the metering system such as in a print module or internal accounting system of the metering system where date storage may reside.

Because the metering system employs multi secure accounting systems, an internal accounting system and an external accounting system, the metering system includes a prioritization arrangement to determine which accounting system should be used for debiting and crediting activity. Any time two accounting systems are present, a user wanting to print an indicia or digital token could enter postage value and debit the active accounting system. The metering system provides the capability for a system where many external accounting systems may be employed by a single metering system. The metering system includes a portable device connector which enables funds debiting, token retrieval, funds audit and crediting of multiple accounting systems. Depending upon the meter system configuration of the number and type of secure accounting systems, internal to the metering system or external to the metering system, a selection criteria is used to choose the active accounting system. The possible configurations in the metering system shown in FIG. 1 include an internal secure accounting system only, an external secure accounting system only and an internal and (optional) external secure accounting systems. In the case where there are both an internal and optional external accounting system, a choice must be made as to which accounting system should be used when both accounting systems are present in the metering system.

The metering system shown in FIG. 1 accommodates the generation of digital tokens by both the internal and external secure accounting systems. Since the indicia includes the digital token and/or other information (as for example the information set forth in the proposed U.S. Postal Service Specifications), it is necessary to insure for a valid mailpiece to be prepared that the proper accounting system information is utilized in generating the digital token and that such digital token is employed in printing the mailpiece. This is necessary for the mailpiece to properly be put into the mail stream by the mailer and so that the carrier service may properly authenticate the mailpiece.

Digital tokens to be printed by the metering system 2 may include information which is in part based on the licensing Post Office zip code or other location information related to the meter user, hereinafter referred to as origin postal code. Currently, postage meter secure accounting systems which generate digital tokens are mounted within a meter base housing. This prevents the accounting system from being moved between meter bases.

When an indicia is printed, digits are generated that utilize forms of the origin postal code that are then printed as part of the indicia. These digital tokens are then used to verify the correctness and validity of portions of the digital indicia. Since historically, there is only a single vault (accounting system) and a single printing engine and the system is not easily portable (as a smart card), meter location movement has not been as serious an issue. With portable external accounting system meters, however, it is quite easy to move and use a portable secure accounting system between many printing engines "bases" spanning different postal regions (origin postal codes). The present system helps assure that the secure accounting system utilizes the correct postal code related data when generating the secure digital tokens or indicia.

Moreover, in a metering system such as shown in FIG. 1 that provides the capability of supporting more than a single secure accounting system, such as plural portable external accounting systems which may be from different origin postal codes, the meter system operates to update the packed postal code (origin postal code with any desired additional data) and the postal check digit that may be used by the vault to generate the secure digital tokens. The system shown in FIG. 1 stores target origin postal codes and operates to detect and transfer the origin postal codes to the secure accounting system to assure correct generation of the digital tokens.

The digital indicia or digital token contains an area of secure information that is used to verify the correctness and authenticity of the digital indicia. For example, these digital tokens may include the vendor ID, vendor digital token, postal digital token, and an indicia check digit. In encryption systems of this type, in order to correctly generate the indicia check digit, vendor digital token, postal digital token, the packed postal code and the postal check digit for the origin postal code may be used. The origin postal code is usually the code associated with where the mailpiece will be sent from. This has also usually indicated where the meter is located. However, in products which separate the vault from the printing engine or "base," the vault can easily be moved from one origin postal code location to another. The packed postal code is derived from the origin postal code and it is used to represent the origin postal code in the calculation of the digital tokens mentioned above. The postal check digit represents the contribution of the origin postal code to the indicia check digit.

Since the metering system printing module may be physically contained within the base portion, it is not as easy to transport (as a portable external accounting system, e.g. smart card) and less likely to be moved between postal code locations. If this unit is moved, it is expected the user would contact the meter system manufacturer so that the postal code location stored within these systems may be updated. On the other hand, the external secure accounting system is quite easily transportable within a postal code region or between postal code regions. Furthermore, since in the present system there is no need for a correlation to be made between the external accounting system and the base and printing engine, any external accounting system may use any base with its associate removable printing module.

To insure correctness of the token generation, a master set of the origin postal code along with its associated packed postal code and postal check digit are stored within the base printing module. The initialization of this information occurs the first time the meter system user contacts the manufacturer for the initial refill of the secure accounting system with postage funds. At this first refill, the meter system recognizes it needs all of the postal code related data and electronically requests the data be downloaded to memory. At this time, the system will update the currently active secure accounting system in the meter system. The active secure accounting system could be either embedded within the meter system (internal accounting system) or inserted into the meter system connector. Anytime, an accounting system is inserted into the metering system, the meter system operates to determines whether the secure accounting system possesses the same postal check digit that is stored as the master postal check digit stored in the memory of the printing module (or where ever else in the base this information may be stored). If the postal check digits match no update is made. This is done to minimize the number of writes to nonvolatile memory of the secure accounting system. The nonvolatile memory in the meter system may have a maximum number of write cycles before the memory starts to degrade. This number correlates to the maximum of number debits made against the meter and consequently the maximum number of times that tokens will be generated.

For meter systems configured with an internal secure accounting system, the update of the internal accounting system postal check digit are initialized at the time the data is received for the base print module initialization. The packed postal code could be updated in the secure accounting at this time as well; however in the preferred implementation, the packed postal code is transmitted at the time the postage funds and date of submission are transferred to the secure accounting system. The vault then uses the information it received prior to the debit as well as information received during initialization at the time the vault was inserted into the base unit housing.

System Organization and Operation

Reference is now made to FIG. 1. A postage meter system shown generally at 2, includes a removable printhead module 4 within a housing 5, a base module 6 and a secure internal accounting system module 8 and an external secure accounting system module 10 which will be hereafter explained in greater detail. The accounting systems include an internal accounting systems 8 and an external accounting system 10. These accounting systems account for the operation of the metering system and for the printing of postage value.

The print module 4 includes a printhead 12 which may be an ink jet printhead or other variable printing means. A printhead driver 14 provides the necessary signals and voltages to the printhead. A temperature sensor 16 is used to sense the ambient temperature. Since ambient temperature changes the viscosity of the printhead ink, this information enables change of the signal and voltages to the printhead to maintain a constant drop size.

A smart card chip 18 which contains internal nonvolatile storage receives encrypted command and control signals from the base unit and provides information to the ASIC 20 to operate the printhead driver 14. The ASIC, may be of the type described in copending U.S. patent application Ser. No. 08/554,179 filed Nov. 6, 1995 entitled MAIL HANDLING APPARATUS AND PROCESS FOR PRINTING AN IMAGE COLUMN-BY-COLUMN IN REAL TIME and assigned to Pitney Bowes, Inc., the disclosure of which is hereby incorporated by reference. The ASIC is connected to a crystal clock 22, obtains the necessary operating program information from a ROM or flash memory 24 so as to appropriately control the sequence of the information to the ink printhead driver such that the printhead produces a valid and properly imprinted indicia (which herein is meant to include a digital token in whatever format it is to be imprinted).

The base module includes a micro controller 26 which is connected to operate the electronic postage meter system motors and display and is coupled to the various accounting systems. The micro controller 26 is connected to a modem 28 which includes a modem chip 30 connected to a crystal clock 32 and a data access arrangement 34 for enabling modem communications between the metering system 2 and external systems.

An RS 232 port 27 is provided. The RS 232 port 27 is connected to the micro controller 26 via a switch 29 which is operated under the control of the micro controller 26 such that either the RS 232 port 27 is enabled or the modem 28 is enabled. Should the RS 232 port 27 be enabled, the port may be used for communicating with the metering system by way of modem, direct connection or other serial communication technique suitable for RS 232 communications.

The micro controller 26 additionally provides various control signals to operate the meter system including signals to the printhead carriage motor, the printhead shift motor and the printhead maintenance motor which are utilized to move, position and maintain the printhead 12. The micro controller 26 is operated under control of two separate crystal clocks 36 and 38. The higher frequency 9.8 megahertz crystal clock is used when the electronic meter system is in active operation and the lower speed 32 kilohertz crystal clock 36 is used when the meter is in a "sleep mode" and the display is blanked and the system is in a quiescent state.

Various power is provided to the micro computer and to the electronic postage meter system including a 5 volt regulated power supply 40, a 30 volt adjustable power supply 42, and a 24 volt regulated power supply 44. Additionally, a battery 46 is connected via a battery backup circuit 48 to the micro controller 26 to provide operating power for an internal clock in the micro controller 26 when the external source of AC operating power 50 is disconnected.

Various electronic postage meter sensors are connected to the micro controller 26 including envelope sensor 52 which senses the presence of an envelope in the envelope slot of the metering system, shift home sensor 54, which senses the home position of the shift motor (Y motor), a cam home sensor 56 which senses the cam position which controls the envelope platen movement, a carriage home sensor 60 which senses when the carriage is at a home position, a maintenance home sensor 58 which senses when print head 12 is at a maintenance position, and a cover open sensor 57.

The micro controller 26 is additionally connected to a key pad 62 and an LCD Display Module 64. This enables a user to enter data into the metering system to view information shown in the display 64.

The metering system 2 employs two accounting systems. The first accounting system involves the internal smart card (or smart card chip) 8 and the second accounting system involves an external smart card 10. These smart cards are micro processor based devices which each provide for secure metering functionality. These smart card accounting systems or smart card vault systems securely maintain various registers associated with the metering system and provide the meter accounting functionality. Additionally, the accounting systems provide for the capability of communicating register information and postage refilling and removal information to add or remove value from the various accounting registers. Each of the secure accounting systems generate the indicia and/or digital tokens needed to be imprinted on a mailpiece by the printhead 12. Additionally, the modules provide for encrypted communications into and out of the accounting system such as may be associated with the funds refilling or funds debiting function. For the particular embodiment shown, the accounting system provides for authentication of the printhead module smart card 18 and the accounting system. Whenever there is a request by a user through the keypad 62 or otherwise, to print postage, or whenever else it is desired, a mutual authentication occurs. The accounting system authenticates that it is in communication with a printhead module smart card chip 18, each authenticating the other as being authentic and valid meter, manufacturer system. Thereafter encrypted communications are enabled between the active secure accounting system and the smart card chip 18 which is part of the printing system to provide security that the messages are authorized uncorrupted messages. This may be by way of a cryptographic certificate.

The metering system 2 provides added functionality and capability to the system by the employment of the two separate accounting systems 8 and 10. The internal smart card accounting system 8 is connected to the micro controller 26 via a plug connector 66. This facilitates removal of the internal smart card 8 should external inspection be required where the device is inoperative. A 3.57 megahertz crystal clock 68 is connected to the smart card 8 and to the micro controller 26. Additionally, the clock 68 is connected to the external smart card 10 via the external smart card plug connector 70. The micro controller provides a smart card sensor switch 72 detects the presence or absence of the external smart card 10. When the external smart card is detected as being present, the switch is connected to the micro controller 26 via the smart card power control circuitry 74 causing the micro controller 26 to enable the external smart card power control circuitry 74 to apply power to the external smart card and gate the crystal clock 68 to provide clock signals to the external smart card 10, both via the smart card connector 70.

It should be expressly noted that the system is configured such that it may be a system operated with both the internal accounting system 8 and an external accounting 10, with only the internal accounting system 8 and only with the external accounting system 10. Moreover the external smart card 10 is arranged so that it can be connected to other electronic metering systems and provides a portable means for a user to have postal funds available for imprinting on a mail piece or tape on other than a specific postage metering system. However, even when connected to a different electronic postage metering system the same authentication between the external smart card 10 and the print head smart card chip 18 occurs.

The system is designed with a priority arrangement. If no external secure accounting system, such as a smart card 10, is connected to the electronic postage meter system 2 the meter accounting functionality is provided by the internal secure accounting system smart card 8. This internal accounting system becomes the active accounting system for the metering system. However, if an external accounting system is connected into the system via the connector 70, the system will make the external accounting system, smart card 10, the active accounting system for the metering system 2.

Connector 70 is a flexible multi purpose connector. The connector 70 enables connections of other types of smart cards such as card 76 which contains ad slogan information (alpha numerics and/or graphic information) card 78 which contains rate table information, and smart card 80 which contains authentication code information. It should be recognized that when each of these cards 76, 78 or 80 is connected into the system via the multi-function connector 70 a self authentication process is effectuated between the smart card and the print module smart card chip 18 to ensure that valid cards and data are being employed. It may use the same encryption and/or crypto graphic certificate techniques to ensure valid authentic and uncorrupted message communication. This system may be used for moving information and data into and out of the meter system 2.

The information of the type stored on cards 76, 78 and 80 are communicated from the card via the connector and the micro controller 26 to the smart card chip 18, the ASIC 20 and is stored in the flash memory 24 or the smart card chip 18 internal memory. For those embodiments which employ a ROM rather than a flash memory, the information is written into the print module smart card chip 18.

A refilling operation for the metering system 2 may be remotely implemented via the modem 28 or RS232 connector 27. A remote connection is established via the modem 28 or RS 232 connector 27 to a remote data center. This enables bi-directional communication between the data center via the modem 28 or connector 27 via the micro controller 26 to either the internal accounting system 8 and/or the external accounting system 10 and to the print module smart card chip 18. The system is configured such that if an external smart card 10 is connected to the system via connector 70, the communications will be with the external smart card and not the internal smart card chip 8. It should be expressly recognized that other protocols can be implemented by use of the keyboard to designate which of the two accounting systems should be the active system for the purpose of recharging or other meter system operation.

Whether communication is with the internal smart card chip 8 or the external smart card 10, the communications involves the remote data center interrogating the internal or external accounting system to obtain necessary information such as the status of the funding registers (ascending register and descending register) other inspection information such as evidence of tampering, meter system serial number, internal resettable timer status and resets, and other information depending upon the nature of the particular system. For recharging, the user may enter via the keyboard 62 a desired postage funding refill amount and upon suitable and successful interrogation of the active accounting system, the remote data center provides an encrypted recharging message which is communicated into the accounting system enabling refunding of the accounting system register with added additional postage value. It should be also noted that communications in this matter enables remote inspection of the metering system integrity and to upload or download other information relating to the meter system operation such as monitoring the operability and maintenance from the print module 4. Additionally, if various meter usage information is maintained in the system, this information may be uploaded to the remote data center. Moreover, the remote data center provides a vehicle for downloading additional and new encryption key or keys into the system if so configured and provides the capability for other functionality and services such as meter usage profile. Moreover, at the time of remote meter resetting, a receipt may be caused to be imprinted by the print module as a receipt for the postage accounting system funds refilling. The receipt provides tangible evidence to the user of the date, time, amount and other pertinent data of the postage accounting system refilling transaction. The receipt may include transaction number and encrypted data such as a cryptographic certificate.

In generating digital tokens or indicia, in certain instances and for certain postal authorities, the digital token is required to contain information concerning the physical location of the electronic postage of the metering system. This may be because of licensing requirements wherein a particularly meter is licensed to be operated in a particular location, as for example within a particular zip code area, the originating postal code of the mailer. The metering system 2 accommodates this requirement and enables the utilization of an external smart card from originating zip locations other than that the of the license location for the metering system 2. The meter location information may also be important where it is required for use when metered mail must be deposited within the zip code or originating location of the mailer.

In initialization of the meter, that is when the meter is put into service and rendered operable, the location of the metering system 2 is stored in the print module memory 24 or the internal memory of chip 18. This information may be the originating zip code for the mailer or other required location or other information. The information in the flash memory 24 or the smart card chip 18 is employed in imprinting a indicia or digital token on a mail piece by print head 12. It is necessary that the digital token generated either by the external smart card 10 or the internal accounting module 8 be such that the digital token which contains originating postal code data be such that it is accurate and consistent with the data stored in the flash memory 24 or smart card chip 18 internal memory.

At the time of initialization, the originating location data may be also stored in the internal accounting system 8. When an external accounting system or smart card 10 is connected into the system, and a request for postage is initiated, as part of the authentication process, communication is established between the external accounting system 10 and the print head smart card chip 18. At that time, a comparison is made between the originating location information stored in the flash memory 24 or smart card chip 18 internal memory and the originating location information stored in the external smart card 10. If there is a correspondence between these two stored location information, the printing of postage and generation of the digital token or indicia may proceed in the normal fashion with any other authentication and processing that may be employed. However, if the location information stored in the flash memory 24 or smart card chip 18 internal memory is inconsistent with the location information stored in the external smart card 10, the system will not operate. At this time, the location information in the external smart card is written over or alternatively may be put in a separate memory location (a travel memory location). Correspondence now exist between the location information stored in the flash memory 24 or smart card chip 18 internal memory and the location information stored in the external smart card 10. Thus, when imprinting postage and generating digital tokens an agreement exists between the data generated on the mail piece from the location information in the flash memory 24 or smart card chip 18 internal memory and from the location information stored in the external smart card 10.

If desired and as part of a routine check, the location information stored in the external smart card can be periodically checked against the location information stored in the flash memory 24 or smart card chip 18. Moreover, location information stored in both the flash memory 24 and the internal accounting system or external accounting system can be checked, if desired, whenever communications are established with the remote accounting center via the modem 28 or RS232 connector 27. Still further, should it be desired, a special purpose external smart card may be connected into the system to interrogate and verify various information stored both in the flash memory 24 and the internal smart card chip 18 or internal accounting system 8.

Figure 2:
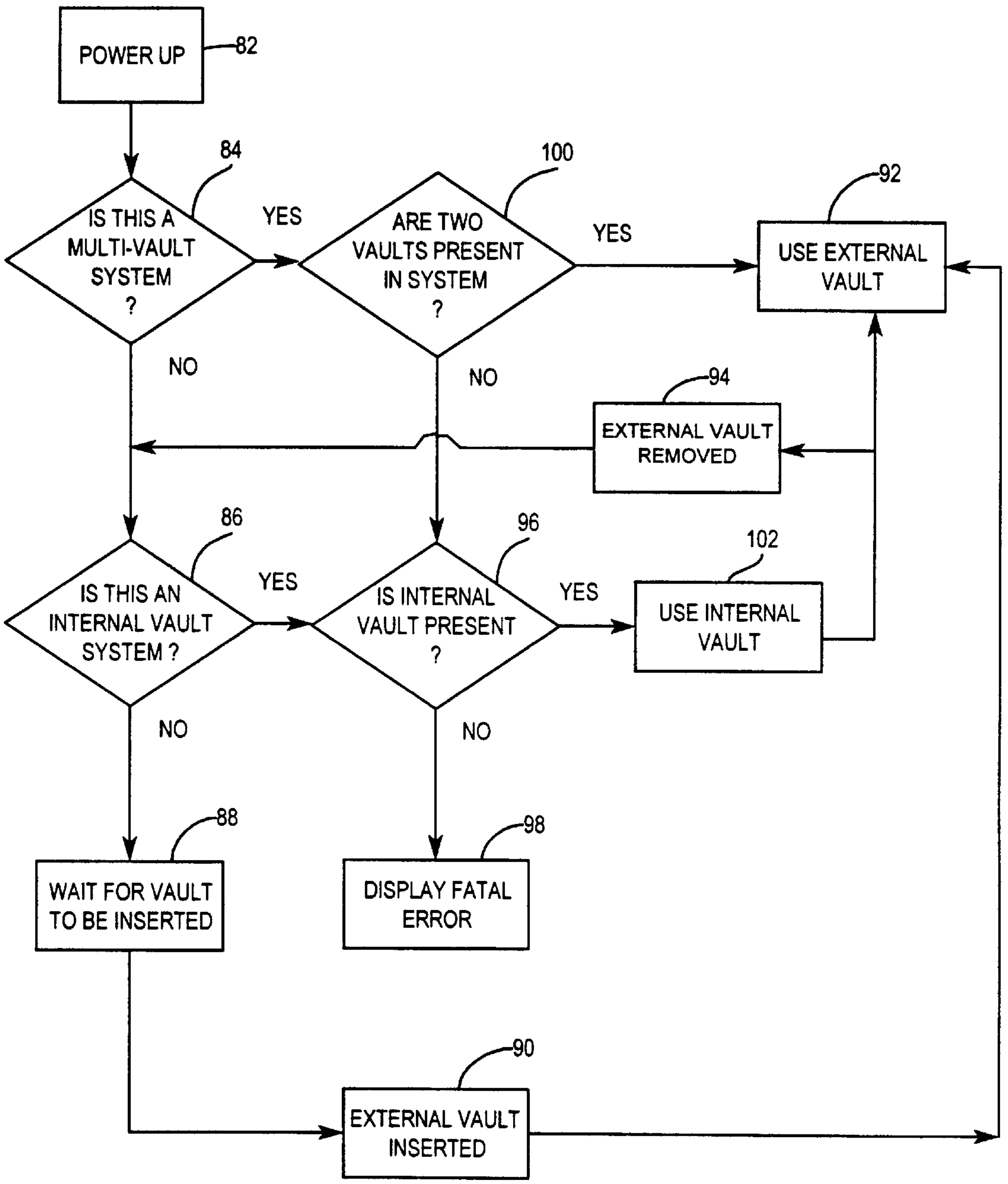
FIG. 2 is a flow chart of the metering system shown in FIG. 1 in a multi-accounting system environment.

Reference is now made to FIG. 2. At 82 the electronic postage meter system 2 is powered up. A determination is made at 84 if the system is a multi secure accounting (vault) system. That is, a determination as to whether the system includes multi accounting systems. If the system is not a multi vault accounting system, a further determination is made at 86 if the system is an internal vault system. If the system is not an internal vault system, the system must be an external vault only system. Accordingly, at 88, the system waits for a vault to be inserted.

When the external vault is inserted at 90 (or determined to be already present), the system uses the external vault for all accounting and for other secure functions at 92. Should the external vault be removed as is shown at 94, a determination is then made if an internal vault system is at 86. If no internal vault is present, no valid accounting system remains in the meter system 2 and a fatal error is displayed at 98 in the display 64. The meter system is rendered inoperable for printing postage and other operations requiring a secure accounting system.

If a determination is made that the system is a multi vault system at 84, a further determination is made at 100 if two vaults are present in the system. If two vaults are present, the system will use the external vault as shown at 92. Thus, where two vaults are present, the system always defaults to using the external vault. If a determination is made that two vaults are not present in the system at 100, the operation continues to decision box 96 as previously noted. If a determination is made that an internal vault is present at 96, the system uses the internal vault as shown at 102. This would also be the case from decision box 86 where a determination is made if the system is an internal vault system.

As can be seen from the above, when the system is powered up, the meter system 2 always defaults to operation using the external accounting system or vault. If, however, the external vault is removed at any time during operation, the system changes to utilization of the internal vault when the external vault is removed. If, on the other hand, the system has only an external accounting system or vault and the vault is not present, the system waits until an external vault is inserted into the system to commence operation. Further, if the system is an internal vault only system and a vault is not sensed as being present, the system will display a fatal error and will not operate.

Figure 3:
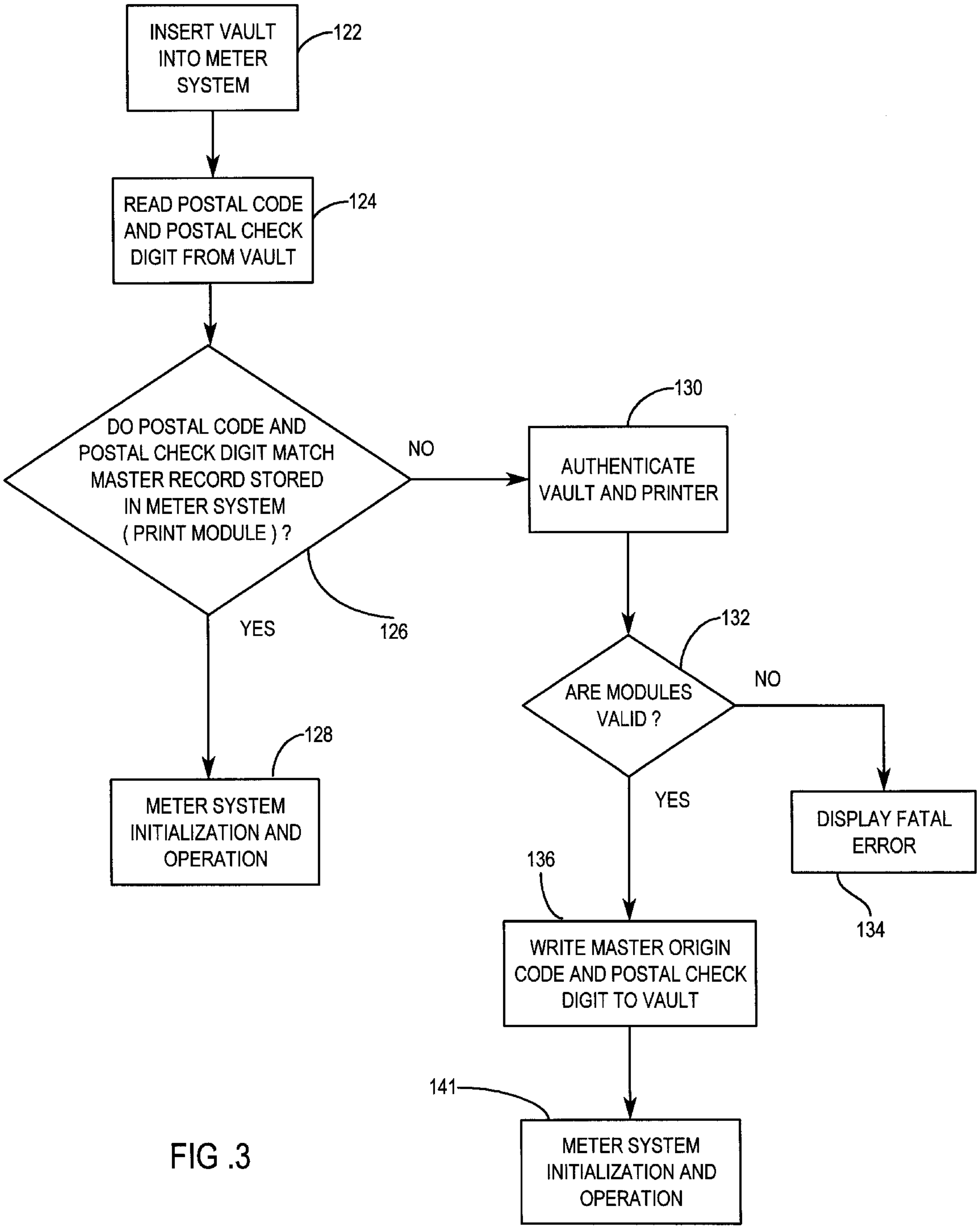
FIG. 3 is a flow chart of the operation of the meter system shown in FIG. 1 in determining whether the portable means (shown as a smart card) contains the proper location data or other data employed in generating digital tokens.

Reference is now made to FIG. 3. A vault is inserted into the meter system at 122. This may be an internal accounting system inserted at the time of manufacture or an external vault inserted at any time during use. Additionally, should a different vault be inserted into the system as a substitute for the internal vault this procedure will also be followed. Additionally, the process is followed during power up of the metering system.

The postal code and postal check digit or other information is read from the vault at 124. At 126, it is determined if this postal code and postal check digit or other information matches with the postal code and postal check digit and other information stored in the meter system. Information is stored in the meter system printing module in flash memory 24 or printing module smart card chip 18 internal memory. If the information matches, the system continues initialization and operation at 128. If the information does not match, the vault (accounting system) and printer printing module attempt to authenticate each other at 130. If it is determined at 132 that the accounting system module and the printing module are each valid and have authenticated each other, the postal code and postal check digit or other data stored in the printer module flash memory 24 or smart card chip 18 internal memory are written into the vault at 136. The meter system continues its initialization and operation at 141.

If it is determined at 132 that the accounting system and printing module are not valid, that is, they have not authenticated each other, a fatal error message is displayed in the display 64 and the system does not operate at 134.

Overview of System—Initialization and New Physical Meter Location

An automated meter system installation processor is performed remotely from the Customer site rather than at the point of manufacturing or at the district sales office. The system simplifies zip code initialization and update as well as facilitates the process to be performed in a more timely fashion. The system facilitates remote electronic initialization or update of the printable zip code, the packed postal code and the postal check digit into a digitally printing meter at a customer site. The installation system may include a data center host computer, a meter and a communication channel between the two devices as well as the messaging exchange used to provide the needed information to perform the zip code initialization or update.

The printable postal code is often a necessary component of a correct indicia. The packed postal code and the postal check digit may be used in the generation of digital tokens that are also printed in the indicia. These tokens are used to verify the correctness and the authenticity of the indicia.

There are a number of conditions that may occur which result in a meter needing a set of zip code data. The conditions are as follows:

a) Initial use of meter;

b) Replacement of part of metering subsystem by Customer;

c) Customer moves from one accountable post office location to another;

d) Post Office realigns existing accountable post offices;

e) Zip code data initialized incorrectly due to administrative error.

Each of the above conditions fall into two major classifications:

1) Zip code updates that may by originated by the meter

2) Zip code updates that may be originated by the Data Center.

The present system accommodates both allowing for zip code initialization and update to originate from either the meter or the Data Center systems.

Zip code updates Originated by the meter. In the two following situations, initial use of the meter and replacement of part of the metering system, the meter determines that zip code data is needed and consequently initiates the request for zip code data update. Initial use of meter—"Zip code Installation."

When a meter capable of zip code queries and updates connects to a Data Center system, the meter does a local verification to determine if the zip codes are present in the system. If the zip codes are not present, the meter initiates a message exchange requesting all zip code related data needs initialization by the Data Center. Upon receipt of the zip code initialization request, the Host transfers the zip code related data to the meter.

Replacement of part of metering subsystem. The metering system may be a single system or a distributed system where data may be stored in one part of the meter system and utilized by other parts of the metering system. The metering system disclosed in FIG. 1 is a distributed system where the zip code data are stored in the "printing subsystem", but used by both the "printing subsystem" and the "accounting subsystem".

Since the printing subsystem may be replaced as it is in the meter system, it is possible the zip code data will need to be re-initialized due to this condition. When a print module is replaced, it will look like an "initial condition" to the meter resulting in the meter requesting zip code related data update as outlined above.

Zip code updates originated by the Data Center. In the three following situations, the Data Center is aware that the connecting meter needs zip code data update and consequently initiates the transfer of the necessary data. In all of the following situations, the Data Center maintains an "activity log" for each meter serial number known to the Data Center system. At connect time, the activity log is checked to determine whether or not zip code download is needed.

It should be noted that the activity log could also flag instances of a "first-time" connection by the meter as described above, however, replaceable meter subsystem components might for certain systems fall outside of the capabilities of the activity log. Consequently, two mechanisms are provided to deal with the cases of first-time "meter initialization" separately.

Customer moves from one post office location to another "Meter Movement" (new meter physical location). When a Customer moves from one accountable post office to another, the Customer will contact the meter manufacturer to provide notification of the pending move. Once the Customer notifies Pitney Bowes, an indication is set against the meter serial number(s) for that Customer. Notification may take the form of electronic notification via an on-line system embedded in the meter or person to person. When the notification is person to person via a telephone interface, the customer assistance representative will set the indication. The indication acts as a semaphore or flag indicating a need to update zip code related data for the Data Center the next time the given serial number calls into the Data Center.

As the meter connects with the Data Center, the Data Center will check the "activity log" to ascertain whether or not the semaphore flag is set. If it is set indicating zip code related data needs to be updated, a message exchange between the meter and the Data Center will occur. This message performs two activities as follows: 1) Retrieves the current zip code data; and 2) Updates the zip code related data, as necessary. When the meter connects, there are three possible conditions that need to be verified prior to zip code update. The conditions are as follows: 1) Meter connected to correct Base Unit; 2) Meter connected to incorrect Base Unit, with same Zip code data; and 3) Meter connected to incorrect Base Unit with different zip code data.

The meter shown in FIG. 1 and as explained herein has three primary subsystems i.e. the "printing subsystem", the "base subsystem" and the "accounting subsystem". For each base there is a single printing subsystem. For some base and printing subsystem combinations there may be none, one or many distinct accounting subsystems. Furthermore, for cases of one or many accounting subsystems, the subsystems may reside within the base or external to the base subsystem. For instances where the accounting subsystem resides external to the base subsystem, some provision has to be provided in order to ascertain, if the receiving base subsystem is the correct base to receive the zip code data related to this Customer. There is a message and Customer prompt sequence used to minimize the probability of incorrectly updating the zip code data in the wrong base subsystem.

After the initial dialog between the Data Center and the meter, the Host queries the meter for its current zip code data, accounting registers and access code. Once received, the Host compares the received zip code data with the expected data. If the data is different than expected, the Data Center will not attempt to update the zip code data. The Data Center will assume this base is not the expected base associated with the meter serial number. If the received data matches the expected data, the Data Center will transmit the associated data to the meter. Once received, the meter will provide a prompt via a display. The prompt will be used to query the User as to whether or not the zip code data sent from the Data Center should be used to update the local base. If the zip code data is accepted by the User, the meter zip code data will be updated. If the User selects not to accept the zip code data, the base will disregard the zip code update. Once the User responds to the prompt, the base will send a status back to the Data Center indicating the state of the zip code update request. Once the status is received by the Data Center, the Data Center will clear its local semaphore completing the zip code update transaction. It should be noted that the dialogue with the user via the display can occur after the meter "hangs up" from the data center. This is the preferred since it reduces the amount of modem connect time between the meter and the data center.

The accounting registers are retrieved in order for the Data Center to snap-shot the current money available and current money spent in the system that is, the status of the ascending and descending registers. Since in the United States, presently money or value spent prior to the move must be accounted for to one accountable post office and remaining will be accounted for to the new accountable post office. The meter access code or other cryptographic technique is used as a secure signature verifying the internal registers are correct for that meter serial number.

Post Office realigns existing accountable Post Offices. Over the life of the meter, it is possible that the United States Post Office will realign their accountable Post Offices. For meters that are effected by this change, a method must exist in order to update the new postal code. The system provides a system whereby the meter manufacturer is able to initiate the zip code download either before or after a Customer invoked postage funds refill, remote meter resetting. Furthermore, when realignment occurs, it has required the manufacturers Customer Service to intervene in order to update the Customer's meters. The present system eliminates that need and performs the entire operation electronically.

Zip code data initialized incorrectly due to administrative error. This condition is treated as outlined in above where there is a realignment of existing accountable post offices.

Orderly Transfer of Zip code Data. Whether the zip code update originates from either the meter or the Data Center, a series of message exchanges occur to transfer the data between the systems. The initial dialog exchange provides the meter identification, meter serial number and an account number associated to the given meter to the Data Center. If the Data Center determines the meter requires zip code update, a secondary query by the Host requests the current zip codes stored in the meter. The accounting system query is made in order to determine the following: 1) Accounting subsystem is in the correct base subsystem; and 2) Zip code data may be updated from past message dialog, but line lost prior to status returned by the base subsystem.

The metering system shown in FIG. 1 provides a mechanism for the entry of any data known to the Customer, but not known to the meter at the time the meter arrives at the Customer site. For example, data known by the Customer includes order number and remote meter resetting system account number. The meter serial number and meter identification will have been initialized prior to shipment to the Customer.

If the data provided in the message exchange is not correct, the Host will provide an indication to the remote Data Center that an installation could not be performed for some particular reason. The reason will be provided by the Data Center, given the Data Center is able to reconcile the cause of the failure, the meter will provide some indication via a Customer interface (display) in order to facilitate orderly correction of the problem, where possible. Upon correct entry of information, another connection will need to be made to the Data Center to complete the installation process.

By defining operational parameters from the Customer site, the manufacturer can lower operating costs associated with meter initialization and post manufacturing handling. Also, by performing some meter system initialization at the Customer site, the manufacturer can provide delivery of the meter eliminating a manual step in the process.

When the Customer receives the meter system, there is no postage in the meter system. This will require the Customer to invoke a refill session to obtain postage funds. At the time of this first refill, the meter is able to detect that parameters are not present in the system that are needed to properly print an indicia. Upon connection to the remote meter resetting system data center, the meter requests the initialization of the needed data. When the data is received, the meter is then prepared to properly print an indicia. Consequently, the meter becomes enabled to print. To print a valid indicia, digital tokens, from the vault, the postage amount, optionally the date of submission and the origin postal code usually must be printed. However, as cited above, many encrypted indicias that include digital token may have all forms of different data and in different forms utilized or not utilized, as the case may be, for that particular system. Since the meter's destination is not known at the time of manufacturing, a mechanism is provided to initialize the origin postal code so that valid indicias can be printed.

Since the User may not know the origin postal code of their licensing post office, it would be error prone to permit the Customer to enter the data. This and other potential sources of errors are overcome as explained below.

In order to print a valid indicia, in certain systems a postage vault capable of generating digital tokens, may need a mechanism to set and maintain the time of day as well as a calendar and the origin postal code. This data may be needed to generate a valid indicia. Since the meter's destination is not known at the time of manufacturing, a mechanism is provided to initialize the meter with the necessary data to support valid indicia generation.

For the metering system described herein, no handling at the district center or office of the manufacturer is required, thereby reducing manpower needed to process the meter as well as the time from order placement to order shipment. Once ordered, the packaged meter may be sent directly to the Customer. However, the origin postal code still must be initialized before the meter may be used by the Customer. When the meter is powered on, the Customer will be able to perform funds retrieval, meter setup, print maintenance including printing a sample pattern to verify the print head is operational as well as invoke a refill with the remote meter resetting system. However, the Customer will not be able to frank an envelope.

When the Customer performs the refill, the meter requests the data to be transmitted from the Data Center to the metering system. Since for low cost meter systems, it is expected that the Customer will have ordered the meter via a telemarketing center, the manufacturer telemarketer will have taken the necessary information to determine the licensing post office for that Customer. This information will be stored in a Data Center data base so that when the Customer makes the first modem contact with the manufacturer, the data is available for transmission to the Customer's meter.

Typically, the Customer would request funds at this time, however, the meter, if desired, provides the capability to invoke a "zero" dollar refill so that the meter can receive initialization data without requesting funds. Only when the meter detects the condition that it has no zip code will it request the information be transferred. Once the origin postal code information is received, the meter will update a semaphore or flag to indicate the data is present. The length of the data is also known since it is transmitted along with the origin postal code information. Upon receipt of this information, the length is expected to be non-zero. Since the origin postal code data is now present in the system, the meter is capable of printing postage if all the other necessary conditions are present.

Operation of Initialization System and "Meter Movement" System

Figure 4:
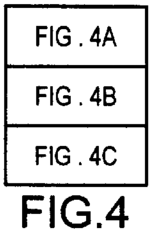
FIG. 4 consists of FIGS. 4A, 4B and 4C and is a flow chart of the first time a meter system such as shown in FIG. 2, is initialized.
Figure 4A:
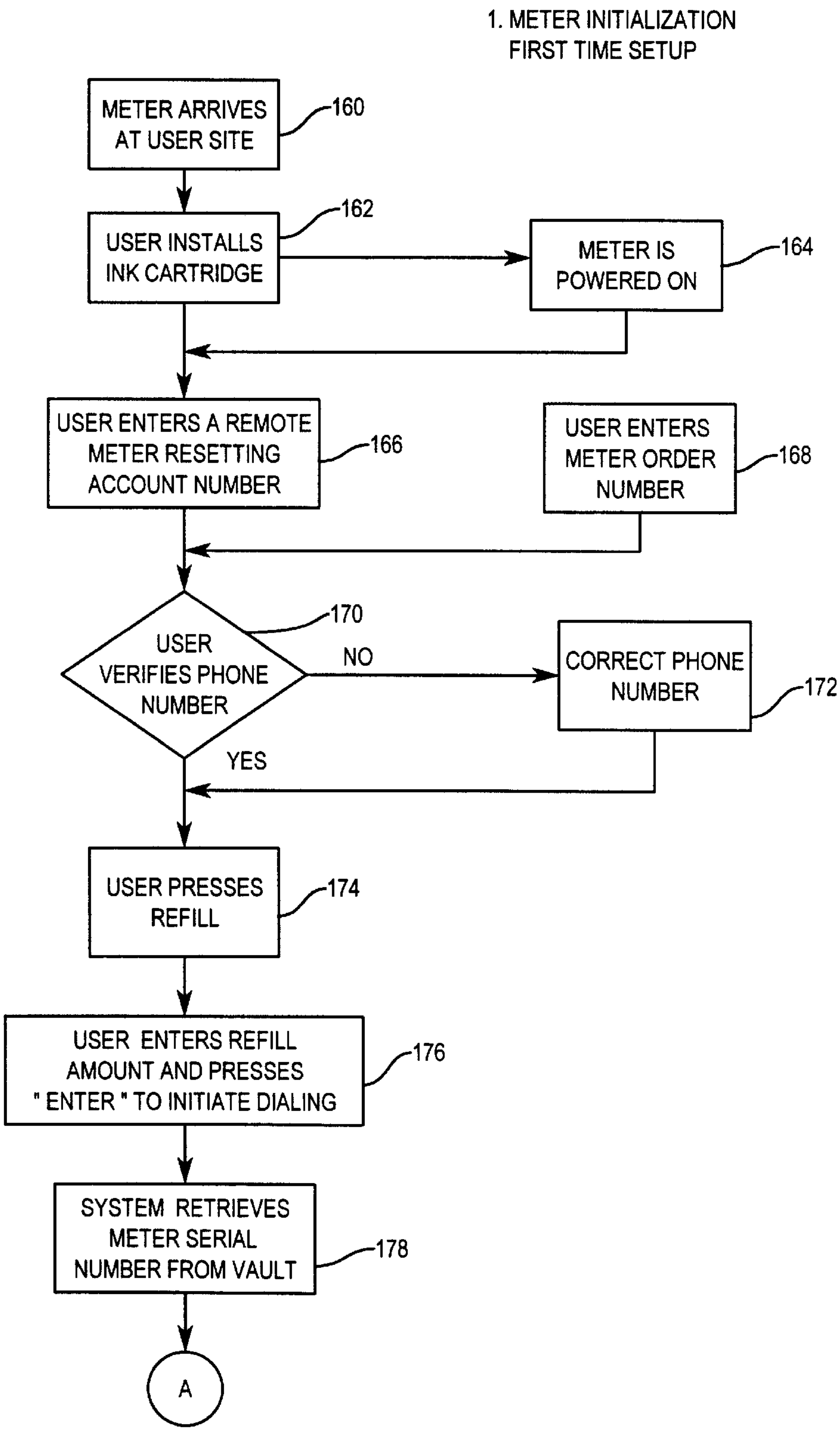
Figure 4B:
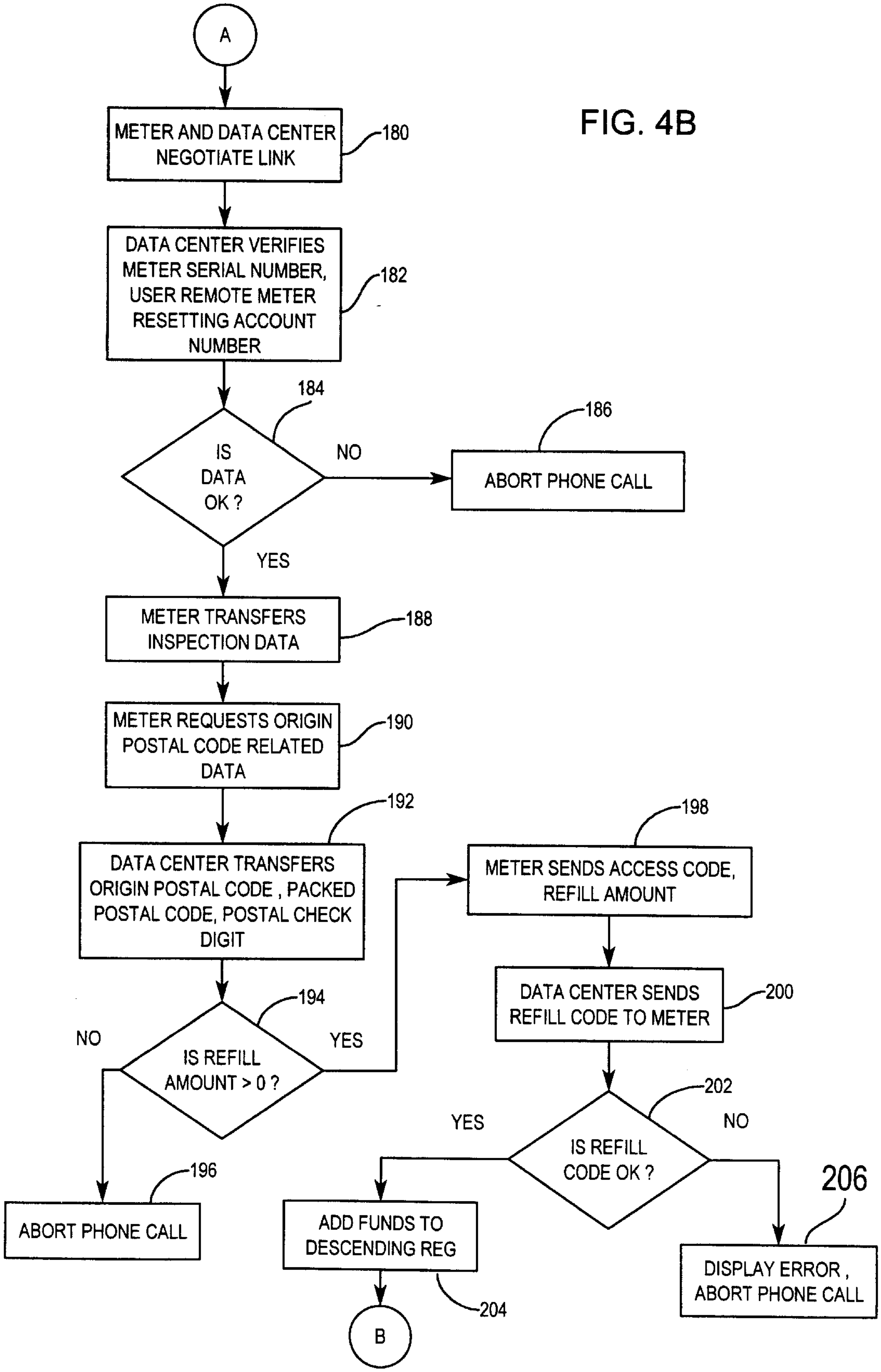
Figure 4C:
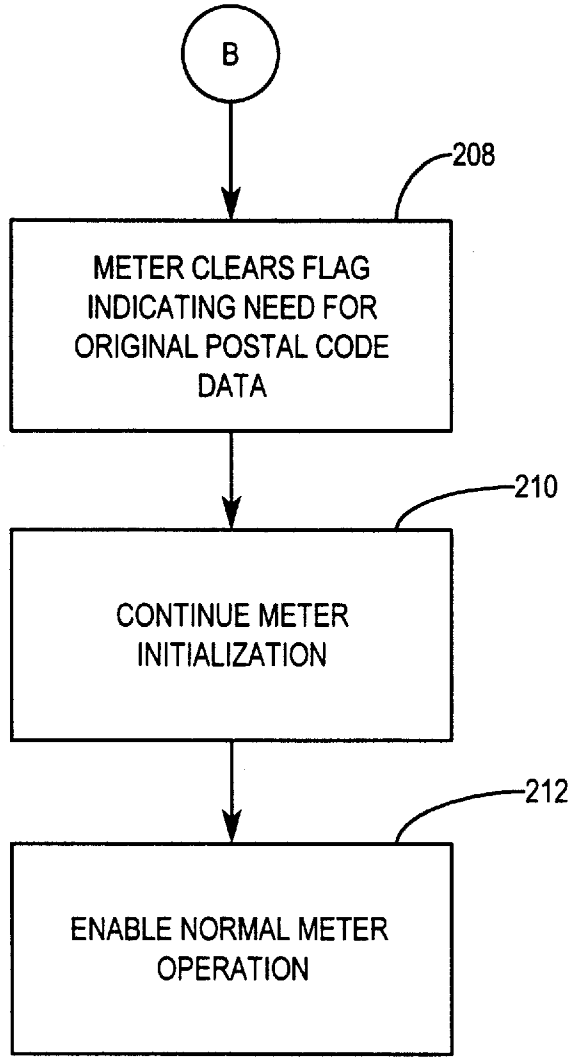

Reference is now made to FIGS. 4A, 4B and 4C. A meter arrives at a user site at 160. The user installs the ink cartridge or other inking system, if necessary, and any other supplies that are required to be installed in the metering system 2 such as batteries and any packing material holding the printing mechanism in other portions of the meter in place for shipment. The meter is thereafter powered on at 164. The user then enters via the keyboard or modem, a remote meter resetting account number associated with the user at 166. This is an account number that would be pre-established by the user prior to operating the meter and is assigned by the meter manufacturer to the customer. The assignment of the account number can be before or after the meter arrives at the user site. The user enters a meter order number at 168. This meter order number is assigned by the manufacturer at the time the meter is ordered by the user and can also be included in the paperwork with the physical arrival of the meter. The user then verifies the manufacturer remote resetting phone number at 170. This is accomplished by comparing the number which appears in a meter system display 64 to a list of numbers provided by the meter manufacturer. This is for meters that have phone numbers pre-installed, alternatively, the phone number can be entered directly by the user via the keypad. If the meter phone number is incorrect, the phone number is corrected by the user at 172. The correction can involve dealing with issues such as using 9 to get an outside line as is common in many office facilities using 800 numbers, Watts lines and the like. If the user verifies the phone number is correct at 170 or after correcting the phone number at 172, the user thereafter presses the meter funds refill key at 174. The user enters the funds refill amount and presses enter to initiate a dialing at 176. The system retrieves the meter serial number from the active vault in the system at 178. The meter and the data center negotiate the establishment of communication link at 180. Thereafter, the data center verifies the meter serial number and the user remote meter resetting account number at 182. If the data identifies as being okay at 184, the process continues. However, if the data is not verified as being okay, the procedure aborts the phone call at 186 and an error message is displayed in display 64.

The process continues with a meter transferring inspection data to the remote meter resetting data center at 188 and thereafter the meter requests from the data center the origin postal code related data which is transferred to the meter at 190. This origin postal code related data, discussed above, is written into the active vault of the system and also into the print module smart card chip 18 internal memory for print module for a flash memory 24. The data center transfers the origin postal code, the packed postal code and the postal check digit at 192. A determination is made at 194 if the refill amount is greater than 0. If the amount is not greater than 0, the meter aborts the phone call and returns to normal operation at 196. If the refill amount is greater than 0, the meter sends the access code and refill amount to the data center at 198. The data center after verifying the access code, refill amount and various account numbers associated with the user sends a refill code to the meter system at 200. A determination is made at 202 if the refill code from the data center is okay. If the refill code is okay, the funds are added to the descending register of the meter system at 204. If the refill code is not okay, an error message is displayed in the meter display 64 and the phone call is aborted at 206.

After the funds are added to the descending register at 204, the meter clears the flag for indicating the need for origin postal code data at 208. This meter flag inhibits operation of the meter system until cleared. The meter initialization continues at 210. This further initialization involves normal electronic systems equipment operation such as clearing memory locations and the like at 210. The meter is then enabled for normal meter operation at 212.

Figure 5B:
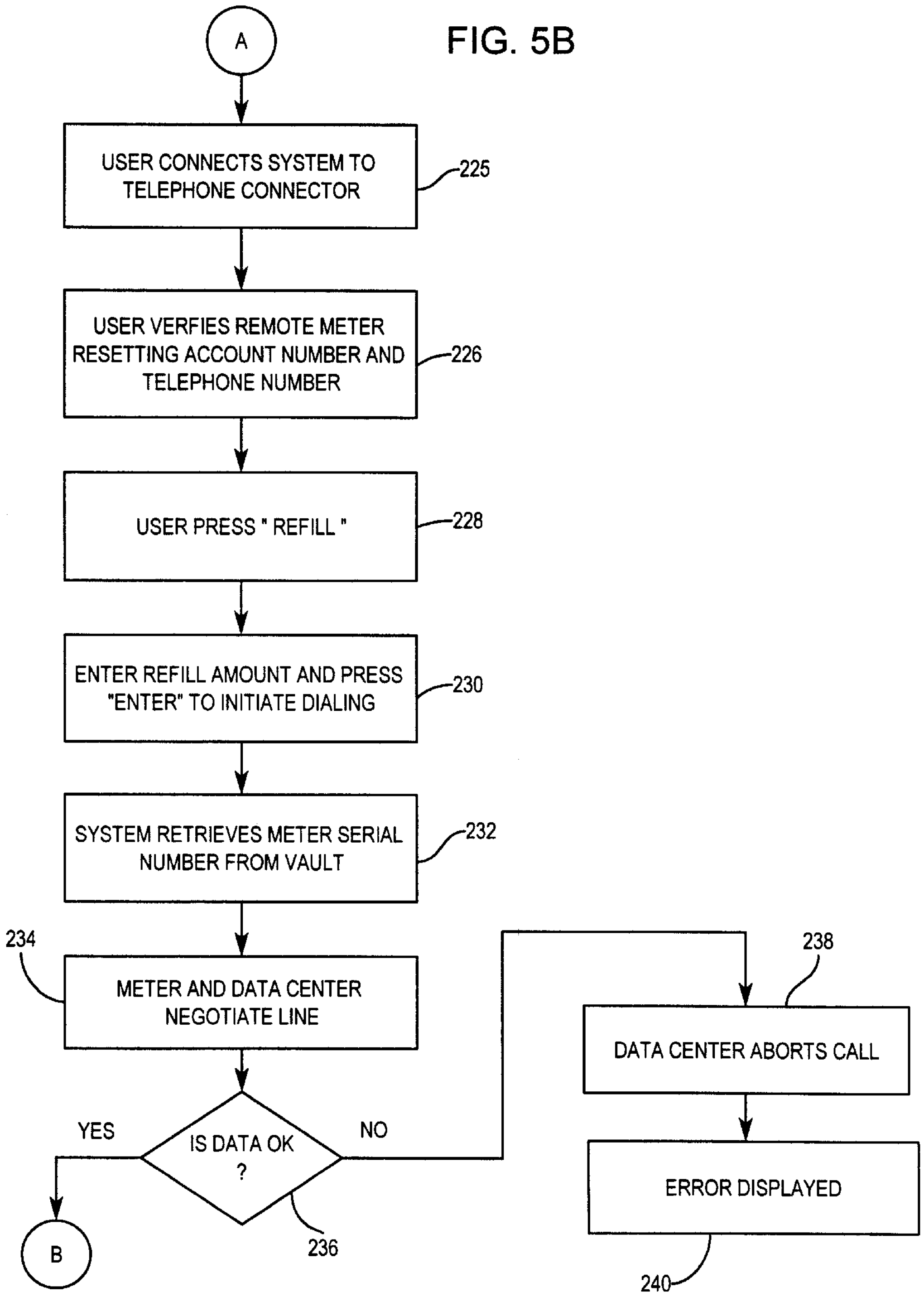
FIG. 5 consists of FIGS. 5A, 5B and 5C and is a flow chart of the process when the meter physical location is changed to a different origin postal code location or licensing post office; and, FIG. 6 is a flow chart of the type of operation included in the determination made in decision block 236 of FIG. 5B and 184 of FIG. 4B which is, helpful in the understanding of the operation of the meter system in determining whether data received from the meter by the data center should be accepted as valid.
Figure 5C:
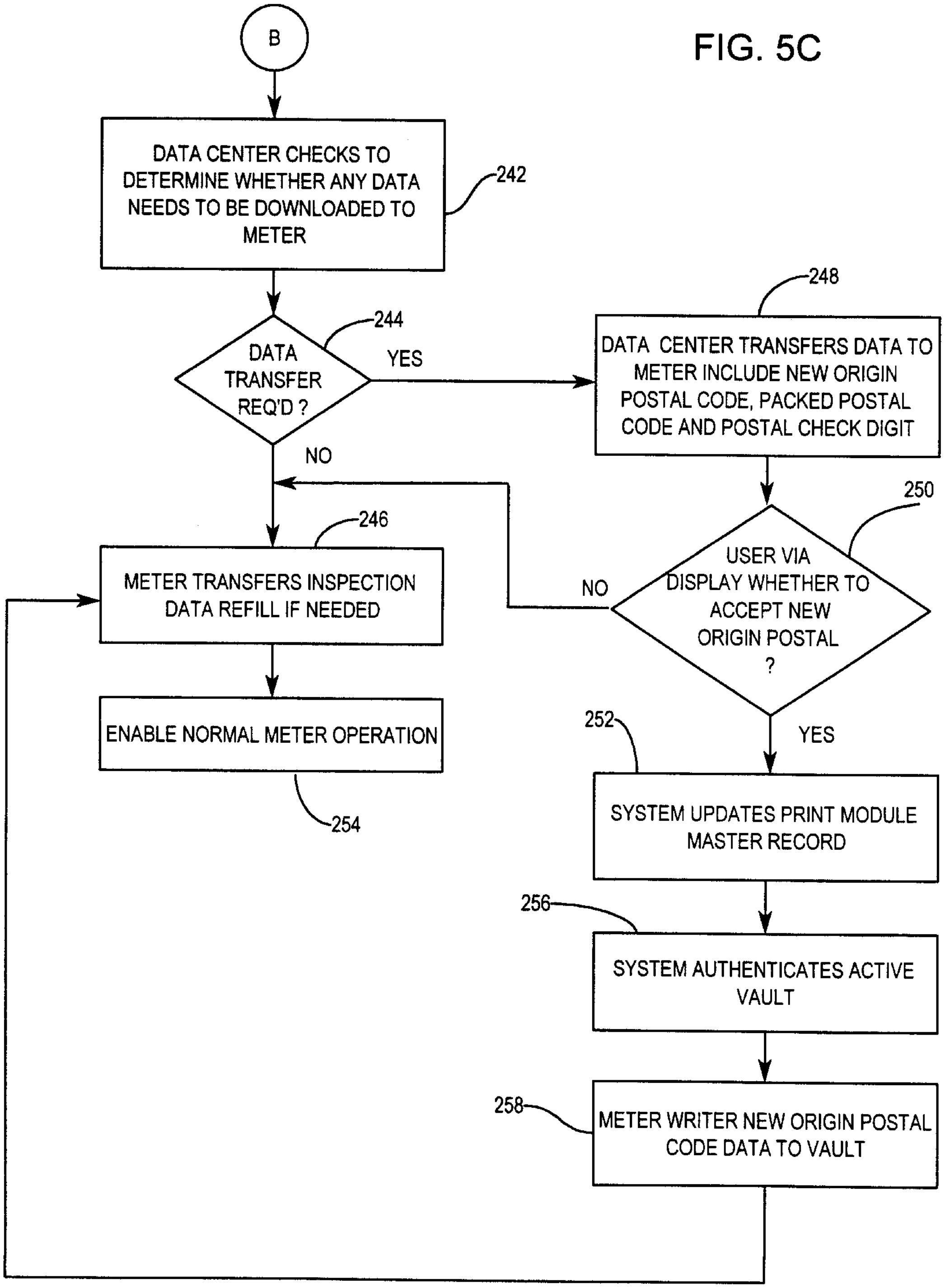

Referring to FIGS. 5A, 5B and 5C, once a meter has been moved to a new location, the user contacts the manufacturer meter help line via telephone at 214. This telephone contact can, in fact, be initiated prior to the physical move of the meter, if desired. The user identifies himself via the users remote meter resetting account number, meter serial number, and customer order number and indicates the meter is moved or will be moving to a new location at 216. It should be recognized that the user may identify their name and address or other data or parts of the data and the data can be retrieved from a link data storage at the data center of the manufacturer. The user indicates the old origin postal code and the new meter location at 218. The manufacturer then determines the new origin postal code or new licensing post office at 220. The meter manufacturer help desk indicates to the meter manufacturer data center that an origin postal code download message needs to occur with the meter system in question at 222. At this point in time, the manufacturer data center is conditioned to provide a meter download message at the next communication with the meter system. The help desk then instructs the customer or user to hang up and do a "0" funds refill if no postal funds are needed or an active funds refill operation if funds are needed to be added to the descending register of the meter system at 224. The user thereafter, connects the meter system to the telephone connector "if not connected" at 225. The user then verifies the remote meter resetting account number and telephone number at 226. The user presses the refill key at 228 and enters the refill amount and presses "enter" to initiate dialing at 230. The meter then retrieves the meter serial number from the active vault at 232 and the meter and data center negotiate the communications line connection at 234.

The data center verifies if the data is okay at 236. If the data is not okay, the data center aborts the call at 238 and an error message is displayed in display 64 at 240. If the data is okay, the data center checks to determine whether any data needs to be downloaded to the meter at 242. A determination is made at 244 if any data transfer is required to the meter. If no data transfer is required, the meter transfers inspection data and refill requests if needed at 246.

If, however, the data transfer is required, the data center transfers data to the meter including the new postal data code, packed postal data code and postal check digit at 248. A determination is made at 250 by a meter user via the display whether to accept the new origin postal code. If the meter user accepts the new origin postal code, the system updates the print module master record containing meter location data at 252. If the user does not accept the new origin postal code, the program branches back to block 246 where the meter transfers inspection data to the data center and process a refill request if needed, as previously noted. Thereafter, the meter is enabled to resume normal operation at 254.

If, however, the meter has updated the print module master record at 252, the system authenticates the active vault at 256. The meter writes the new origin postal code data to the active vault at 258. The program then loops back to blocks 246 and thereafter 254 to resume normal meter operation.

Figure 6:
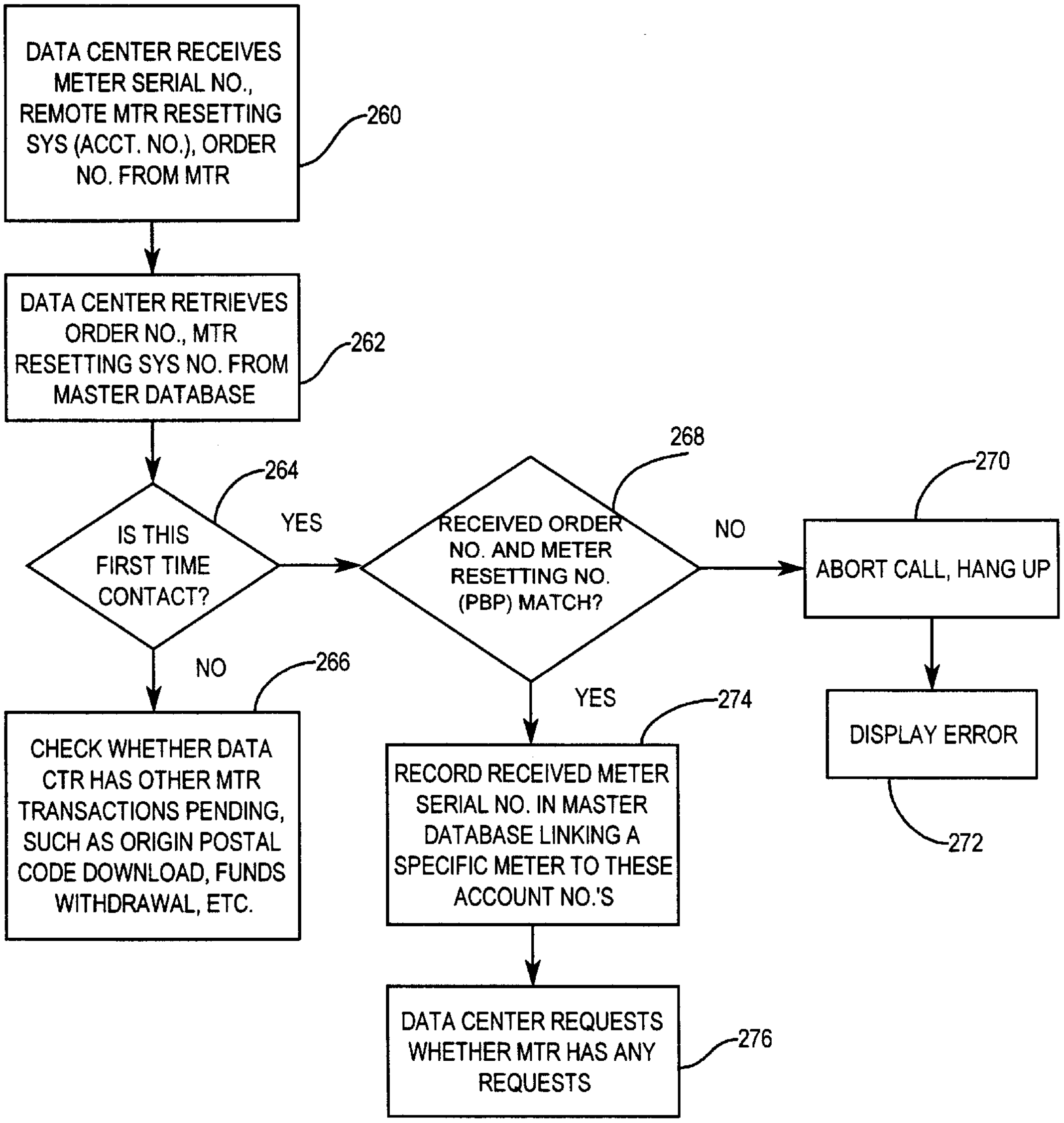

Reference is now made to FIG. 6. The data center received the meter serial number, remote meter resetting system account number and order number from the meter at 260. The data center retrieves the meter order number and the user remote meter resetting system account number from the manufacturers data base. It should be recognized at this point in time the manufacturer data base does not have stored therein the meter serial number and receives this information from the communication link with the meter at 262. A determination is made at 264 if this is an initial first time contact. If not, the data center checks whether other meter transactions are pending such as origin postal code download or download or funds withdrawal at 266. If the contact is determined to be an initial first time contact a further determination is made at 268. If they do not match, the telephone call is aborted at 270 and an error message is displayed in the meter system display 64 at 272.

If the received order number and remote meter resetting number match, the received meter serial number is recorded in the master data base at 274. This links the specific meter to the user remote meter resetting account number and to the meter order number. The data center then requests whether the meter has any pending actions request messages at 276.

It should be noted that any time the meter establishes communication with the data center and the data center has a preexisting download message flag set for the particular meter in question, the data center tracks during the next communication with the meter following the download message that the data was correctly downloaded to the meter. This is accomplished by comparing a meter upload message with the data to the download message data sent to the meter during the previous communication.

By employing this technique of a verification of the accurate download of data, various problems are avoided such as downloading the wrong origin postal code into the wrong printing module subsystem since external vaults may be utilized and a meter user may have previously called a data center to indicate a meter move and thereafter use a external vault and yet a different electronic postage center meter system. By asking the customer to accept or reject the download message in displaying the new origin postal code, this problem is further avoided.

While the present invention has been disclosed and described with reference to the specific embodiments described herein, it will be apparent, as noted above and from the above itself, that variations and modifications may be made therein. It is, thus, intended in the following claims to cover each variation and modification that falls within the true spirit and scope of the present invention.

What is claimed:

1. A method of initializing a value metering device, comprising:

delivering said value metering device to a user;

establishing communications between said user and a remote data center;

said user communicating to said data center identifying data associated with said user ordering said value metering device;

said user communicating to said data center user account identifying data;

said data center verifying said order identifying data and said account identifying data as being valid; and, said data center upon determining that said order identifying data and said account identifying data are valid communicating enabling data for enabling said value metering device to operate, said enabling data indicative of the physical location of said value metering device.

2. A method of initializing a value metering device as defined in claim 1 further including communicating the serial number data associated with said value metering device to said data center.

3. A method of initializing a value metering device as defined in claim 2 wherein said enabling data communicated from said data center further includes data to load value into said value metering device.

4. A method of initializing a value metering device as defined in claim 3 wherein said value metering device is a postage metering device.

5. A method of initializing a value metering device, comprising:

delivering said value metering device to a user, said value metering device having communications capability;

causing said value metering device to establish communications with a remote data center;

said user entering into said value metering device order identifying data associated with said user ordering said value metering device;

said value metering device communicating to said data center said order data; and, said data center communicating enabling data for enabling said value metering device to operate, said enabling data indicative of the physical location of said value metering device.

6. A method as set forth in claim 5 wherein the enabling data is a zip code.

7. A method of initializing a value metering device, comprising:

delivering said value metering device to a user, said value metering device having communications capability;

causing said value metering device to establish communications with a remote data center;

said user entering into said value metering device order identifying data associated with said user ordering said value metering device and user account identifying data;

said value metering device communicating to said data center said order data and said user account identifying data; and, said data center verifying said order identifying data and said account identifying data as being valid; and, said data center upon determining that said order identifying data and said account identifying data are valid communicating to said value metering device enabling data for enabling said value metering device to operate, said enabling data indicative of the physical location of said value metering device.

8. A method of initializing a value metering device as defined in claim 7 further including said value metering device communicating serial number data associated with said value metering device to said data center.

9. A method of initializing a value metering device as defined in claim 8 wherein said enabling data communicated from said data center further includes data to load value into said value metering device.

10. A method of initializing a value metering device as defined in claim 9 wherein said value metering device is a postage metering device.

11. A method of initializing a value metering device, comprising:

delivering said value metering device to a user, said value metering device having communications capability and display capability;

causing said value metering device to establish communications with a remote data center;

said user entering into said value metering device order identifying data associated with said user ordering said value metering device and user account identifying data;

said value metering device communicating to said data center said order data and said user account identifying data; and, said data center verifying said order identifying data and said account identifying data as being valid;

said data center upon determining that said order identifying data and said account identifying data are valid communicating to said value metering device enabling data for enabling said value metering device to operate, said enabling data including data relating to the physical location of said metering device;

displaying said physical location data in said value metering display; and, said user operating said value metering device to accept said physical location data for storage in said value metering device if said physical location data is correct.

12. A method of initializing a value metering device, comprising:

delivering said value metering device to a user, said value metering device having communications capability and display capability;

causing said value metering device to establish communications with a remote data center;

said user entering into said value metering device order identifying data associated with said user ordering said value metering device and user account identifying data;

said value metering device communicating to said data center said order data and said user account identifying data;

said data center verifying said order identifying data and said account identifying data as being valid;

said data center upon determining that said order identifying data and said account identifying data are valid communicating to said value metering device enabling data for enabling said value metering device to operate, said enabling data including data relating to the physical location of said metering device;

displaying said physical location data in said value metering display;

said user operating said value metering device to accept said physical location data for storage in said value metering device if said physical location data is correct;

storing said physical location data at said data center;

causing said value metering device to establish subsequent communications with said data center;

said value metering device communicating to said data center said physical location data stored is said value metering device; and, said data center determining if said physical location data has been correctly stored in said value metering device.

13. A method of relocating a value metering device, comprising:

causing said value metering device to establish communications with a remote data center;

said user entering into said value metering device order identifying data associated with said user ordering said value metering device and user account identifying data;

said value metering device communicating to said data center said order data and said user account identifying data;

said data center verifying said order identifying data and said account identifying data as being valid;

said data center upon determining that said order identifying data and said account identifying data are valid communicating to said value metering device data including data relating to a new physical location of said metering device;

displaying said new physical location data in said value metering display;

said user operating said value metering device to accept said new physical location data for storage in said value metering device if said physical location data is correct.

14. A method of relocating a value metering device having communications capability, comprising:

causing said value metering device to establish communications with a remote data center;

said user entering into said value metering device order identifying data associated with said user ordering said value metering device and user account identifying data;

said value metering device communicating to said data center said order data and said user account identifying data;

said data center verifying said order identifying data and said account identifying data as being valid;

said data center determining if a request for physical location move for said value metering device to a new location is pending;

said data center upon determining that said order identifying data and said account identifying data are valid and an active physical location move for said value metering device is pending, communicating to said value metering device new physical location data.

15. A method of relocating a value metering device as defined in claim 14 wherein said value metering device is a postage metering device.

16. A method of relocating a value metering device having communications capability and display capability, comprising:

causing said value metering device to establish communications with a remote data center;

said user entering into said value metering device order identifying data associated with said user ordering said value metering device and user account identifying data;

said value metering device communicating to said data center said order data and said user account identifying data;

said data center verifying said order identifying data and said account identifying data as being valid;

said data center determining if a request for physical location move for said value metering device to a new location is pending;

said data center upon determining that said order identifying data and said account identifying data are valid and an active physical location move for said value metering device is pending, communicating to said value metering device new physical location data;

displaying said physical location data in said value metering display; and, said user operating said value metering device to accept said new physical location data for storage in said value metering device if said physical location data is correct.

17. A method of relocating a value metering device as defined in claim 16 further comprising:

storing said new physical location data at said data center;

causing said value metering device to establish subsequent communications with said data center;

said value metering device communicating to said data center said physical location data stored is said value metering device; and, said data center determining if said physical location data has been correctly stored in said value metering device.

* * * * *